(12) United States Patent
Steiner et al.

(10) Patent No.: US 10,773,582 B2
(45) Date of Patent: Sep. 15, 2020

(54) AUTOMOBILE VEHICLE BATTERY TRAY WITH SIDE IMPACT RAILS

(71) Applicant: Dura Operating, LLC, Auburn Hills, MI (US)

(72) Inventors: Walter J. Steiner, Rochester, MI (US); Indraneel Page, Farmington Hills, MI (US); Rob Hendren, Macomb, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 16/275,667

(22) Filed: Feb. 14, 2019

(65) Prior Publication Data

US 2019/0255930 A1     Aug. 22, 2019

Related U.S. Application Data

(60) Provisional application No. 62/632,238, filed on Feb. 19, 2018.

(51) Int. Cl.
| | |
|---|---|
| *B60K 1/04* | (2019.01) |
| *B60R 16/04* | (2006.01) |

(Continued)

(52) U.S. Cl.
CPC ............ *B60K 1/04* (2013.01); *B60K 6/28* (2013.01); *B60R 16/04* (2013.01); *B62D 21/02* (2013.01); *B62D 21/157* (2013.01); *B62D 25/025* (2013.01); *B62D 27/06* (2013.01); *B62D 29/007* (2013.01); *H01M 2/1083* (2013.01); *B60K 2001/0438* (2013.01); *B60Y 2200/91* (2013.01); *B60Y 2200/92* (2013.01); *B60Y 2306/01* (2013.01); *H01M 2220/20* (2013.01)

(58) Field of Classification Search
CPC .... B60K 1/04; B60K 6/28; B60K 2001/0438; B60R 16/04; B62D 21/02; B62D 21/157; B62D 25/025; B62D 27/06; B62D 29/007; B60Y 2200/91; B60Y 2200/92; B60Y 2306/01
See application file for complete search history.

(56) References Cited

U.S. PATENT DOCUMENTS

| | | |
|---|---|---|
| 6,571,542 B1 | 6/2003 | Fillman et al. |
| 7,025,160 B2 | 4/2006 | Awakawa |

(Continued)

FOREIGN PATENT DOCUMENTS

| | | |
|---|---|---|
| DE | 102016115037 A1 | 2/2018 |
| EP | 2332761 A1 | 6/2011 |

*Primary Examiner* — Bryan A Evans
(74) *Attorney, Agent, or Firm* — Vivacqua Crane PLLC

(57) ABSTRACT

A battery tray for a battery powered vehicle includes a battery tray having a side wall. An impact absorbing structure is connected to the side wall. The impact absorbing structure includes at least one roll-formed member fixed to the side wall. The at least one roll-formed member is created from a single metal plate and includes a first plate portion roll-formed to create a first cavity and having a first flange created in a member central wall of the first plate portion. The first flange is fixed to the first plate portion. A second plate portion is roll-formed to create a second cavity and has a second flange at an end of the second plate portion fixed to the member central wall. A roll-formed U-shaped attachment member is fixed to the at least one roll-formed member.

20 Claims, 10 Drawing Sheets

(51) Int. Cl.
*B62D 21/15* (2006.01)
*B62D 25/02* (2006.01)
*B60K 6/28* (2007.10)
*B62D 21/02* (2006.01)
*B62D 27/06* (2006.01)
*B62D 29/00* (2006.01)
*H01M 2/10* (2006.01)

(56) References Cited

U.S. PATENT DOCUMENTS

| | | | |
|---|---|---|---|
| 7,610,978 B2* | 11/2009 | Takasaki | B60K 1/04 |
| | | | 180/68.5 |
| 9,855,974 B2* | 1/2018 | Kase | B60R 19/12 |
| 9,862,420 B2* | 1/2018 | Kato | B62D 25/2027 |
| 2006/0096794 A1 | 5/2006 | Yoshida | |
| 2009/0145676 A1* | 6/2009 | Takasaki | B60K 1/04 |
| | | | 180/65.1 |
| 2012/0223113 A1 | 9/2012 | Gaisne et al. | |
| 2013/0270864 A1 | 10/2013 | Young et al. | |
| 2016/0114667 A1 | 4/2016 | Ikeda et al. | |

\* cited by examiner

AUTOMOBILE VEHICLE BATTERY TRAY WITH SIDE IMPACT RAILS

FIELD

The present disclosure relates generally to energy absorbing structures used in battery trays of battery powered automobile vehicles.

BACKGROUND

The statements in this section merely provide background information related to the present disclosure and may or may not constitute prior art.

Automobile vehicles including electric and hybrid vehicles providing at least partial propulsion from battery power create unique conditions that must be considered due to the energy and fluid in the battery cells to absorb structural impact without battery cell damage. The battery trays of known battery powered and hybrid or battery-engine powered vehicles, hereinafter collectively referred to as "battery powered" vehicles, provide features to absorb impact loads from below and from the sides of the battery trays to minimize damage to the battery cells inside, however, the structural designs of such battery trays often require total replacement of the battery tray following minor structural damage, and add significant cost to the battery tray to accommodate impact loading.

Thus, while current battery powered vehicle tray designs achieve their intended purpose, there is a need for a new and improved system and method to absorb battery tray energy loading while reducing design and construction costs.

SUMMARY

According to several aspects, a battery tray for a battery powered vehicle includes a battery tray body having perimeter side walls. An impact absorbing structure is connected to each of the side walls. The impact absorbing structure includes at least one roll-formed member fixed to the side wall. The at least one roll-formed member is created from a single metal plate and includes a first plate portion roll-formed to create a first cavity and having a first flange created in a member central wall of the first plate portion. The first flange is fixed to the first plate portion. A second plate portion is roll-formed to create a second cavity and has a second flange at an end of the second plate portion fixed to the member central wall. A roll-formed U-shaped attachment member is fixed to the at least one roll-formed member.

In another aspect of the present disclosure, the first flange is fixed using multiple spot welds prior to roll forming the second plate portion.

In another aspect of the present disclosure, multiple notches are created in the first flange.

In another aspect of the present disclosure, an impact rail defines a lowest face of the battery tray with respect to a ground level, the impact rail provided of a shape-memory alloy material.

In another aspect of the present disclosure, an impact rail defines a lowest face of the battery tray with respect to a ground level, the impact rail supported to the impact absorbing structure using at least one clip of a shape-memory alloy material.

In another aspect of the present disclosure, the U-shaped member includes opposed first and second walls, the first wall having a first raised rib directed toward the second wall and the second wall having a second raised rib directed toward the first wall. The first raised rib and the second raised rib are directly aligned with each other.

In another aspect, a side rail assembly connected to a battery tray in a motor vehicle is provided. The side rail assembly includes a side impact rail having: a first wall having a first rib, a second wall, the second wall spaced apart from the first wall, the second wall having a second rib, and a third wall, the third wall connected to the first wall and the second wall. The first rib extends towards the second rib and the second rib extends towards the first rib.

In another aspect, the first rib is aligned with the second rib.

In yet another aspect, the first rib extends along an entire length of the first wall.

In yet another aspect, the second rib extends along an entire length of the second wall.

In yet another aspect, the side impact rail is roll-formed from a single plate of metal.

In yet another aspect, the first wall and the second wall are substantially parallel.

In yet another aspect, the third wall is substantially perpendicular to the first wall and to the second wall.

In yet another aspect, a roll-formed member is configured to be connected to the vehicle battery tray.

In yet another aspect, the first wall includes a first flange connected to the roll-formed member and the second wall includes a second flange connected to the roll-formed member.

In yet another aspect, the first flange is disposed at a first free end of the first wall and the second flange is disposed at a second free end of the second wall.

In yet another aspect, the first wall, the second wall, and the third wall have the same thickness.

In yet another aspect, the second rib has a width greater than a width of the first rib.

In yet another aspect, the first wall, the second wall, and the third wall define an interior of the side impact rail, and wherein the first rib extends into the interior and the second rib extends into the interior.

In yet another aspect, the side impact rail is substantially U-shaped.

In yet another aspect, the first rib is disposed centrally along a width of the first wall and the second rib is disposed centrally along a width of the second wall.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
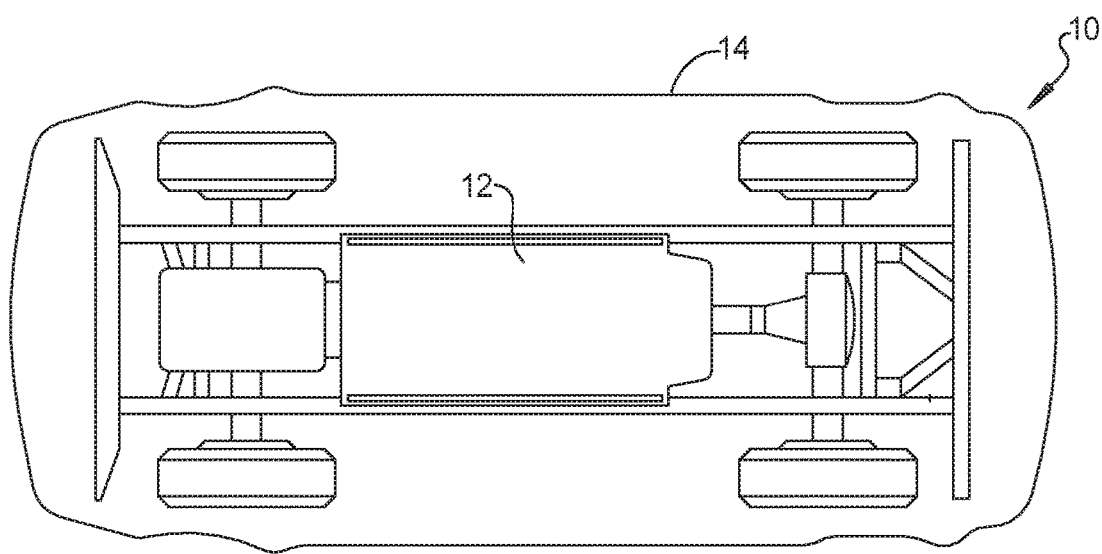
FIG. 1 is a bottom plan view of an automobile vehicle having a battery tray according to an exemplary embodiment.

Referring to FIG. 1, a vehicle battery system 10 includes a battery unit or battery tray 12 structurally mounted to a vehicle 14. The battery tray 12 includes a tub 13 for receiving at least one and according to several aspects multiple individual battery cells within the tub 13 which provide an electrical charge as the sole power to propel the vehicle 14, or may provide supplemental power in addition to an engine. The tub 13 is preferably formed as a monolithic unitary structure, such as by stamping or drawing from a metal sheet to form the entire tub 13. The tub 13 also includes an upper flange 15 that extends outwardly from an upper end of the tub 13 for attachment of the tub 13 to a cover (not shown) or for attachment to side members of the tub 13.

Referring to FIG. 2 and again to FIG. 1, the battery tray 12 further includes a collapsible frame 16 disposed on outer lateral sides of the tub 13. The tub 13 is supported by the collapsible frame 16 as a structural unit and defines an energy absorbing portion. The collapsible frame 16 can be made for example from one or more materials such as rolled metal plate including steel or aluminum, a combination of materials such as a metal and a polymeric material, a composite material and material alloys. The collapsible frame 16 may provide one or more side wall impact absorbing structures or side rail assemblies 18 to connect the collapsible frame 16 to structure of the vehicle 14. The side wall impact absorbing structures 18 may each include multiple apertures 20 which individually receive one of multiple fasteners (not shown) to releasably fix the battery tray 12 to the structure of the vehicle 14. An impact rail 22 can be further mounted along a substantial length of a ground-facing side of each of the side wall impact absorbing structures 18. The impact rails 22 generally form a lowest face of the battery tray 12 with respect to a ground level, and therefore provide an impact face of first contact should the vehicle 14 traverse a ground feature that is contacted by the battery tray 12.

Referring to FIG. 3 and again to FIG. 1, an exemplary one of the side wall impact absorbing structures 18 is shown. An oppositely positioned side wall impact absorbing structure 18 is similar and is therefore not further described herein. Each side wall impact absorbing structure 18 includes a first B-shaped roll formed member 24 fixed to a side wall 26 of the battery tray 12 and a second B-shaped roll-formed member 28 oriented substantially perpendicular to the first B-shaped roll-formed member 24. Each of the first B-shaped roll-formed member 24 and the second B-shaped roll-formed member 28 extend substantially an entire length of the side wall 26 of the battery tray 12. A roll-formed U-shaped attachment member 30 also extends substantially an entire length of the side wall 26 of the battery tray 12 and includes a flange 32 which is fixed for example using weld joint such as a laser weld 34 to an outside facing wall 36 of the first B-shaped roll-formed member 24. The U-shaped attachment member 30 also includes a first wall 38 extending substantially perpendicular to the outside facing wall 36, an outside facing second wall 40 and a third wall 42 oriented substantially parallel to the first wall 38. The third wall 42 partially overlaps an upward facing wall 44 of the second B-shaped roll-formed member 28 and is fixed to the upward facing wall 44 using a weld such as a laser weld 46. The U-shaped attachment member 30 may include the apertures 20 through the first wall 38 and the third wall 42 to receive fasteners (not shown) to releasably fix the battery tray 12 to the structure of the vehicle 14.

A longitudinal cavity 48 is created between first wall 38, the second wall 40 and the third wall 42. Multiple baffles or stiffening plates 50 are positioned within the cavity 48, with a quantity of the stiffening plates 50 predetermined by the anticipated impact loading expected to be received by the second wall 40. The stiffening plates 50 and the U-shaped attachment member 30 will crush or deflect to absorb an impact load directed toward the side wall 26 of the battery tray 12 to help prevent damage to the side wall 26 and therefore to components such as the battery cells located within the battery tray 12. To further enhance a deflection resistance of the stiffening plates 50, each of the stiffening plates 50 may also include a stamped or preformed raised feature 52, having any desirable shape. The first B-shaped roll-formed member 24, the second B-shaped roll-formed member 28, the stiffening plates 50 and the U-shaped attachment member 30 are fixed together for example by welding, for example by MIG or laser welding, and collectively create an impact absorbing structure 54. The impact absorbing structure 54 is also attached to the tub 13, preferably be welding, such as MIG or laser welding.

The impact rail 22 is mounted along and extends for the length of a ground-facing side of the second B-shaped roll-formed member 28 and may be fixed for example by welding or through the use of fasteners. The impact rails 22 generally form a lowest face of the battery tray 12 with respect to a ground level. An impact face 56 of the impact rail 22 is therefore positioned below (as viewed in FIG. 3) a lowest face 58 of the tray or tub of the battery tray 12. The impact face 56 defines a face of first contact should the vehicle 14 traverse a ground feature that is contacted by the battery tray 12. The impact rails 22 are roll formed similar to the first B-shaped roll-formed member 24 and the second B-shaped roll-formed member 28 which are described in greater detail in reference to FIG. 4.

According to several aspects, the impact rail 22 can be a steel material similar to the plate material used for the roll-formed members, or can be made using a shape-memory alloy material, including but not limited to alloys of nickel and titanium. As known, a shape-memory alloy is an alloy that "remembers" its original shape such that if deformed, the material returns to a pre-deformed shape when heated. If an impact load deforms the impact rail 22, subsequent heating of the impact rail 22 can be performed to return the shape of the impact rail 22 to its original shape, thereby precluding the need to remove and/or replace the impact rail 22. According to other aspects, shape-memory alloy material can also be used to form mounting clips 59 used to mount a steel (or other) material impact rail 22 to the impact absorbing structure 54, or to any of the other impact absorbing structures of the present disclosure, such that impact loads that shift the impact rail 22 and deform the mounting clips 59 permit the deformed mounting clips 59 to be repaired without replacement of the steel (or other material) impact rail 22. According to still other aspects, shape-memory alloy material can also be used for any of the roll-formed members or the U-shaped members of the present disclosure to provide the same benefit for repair without replacement.

Figure 2:
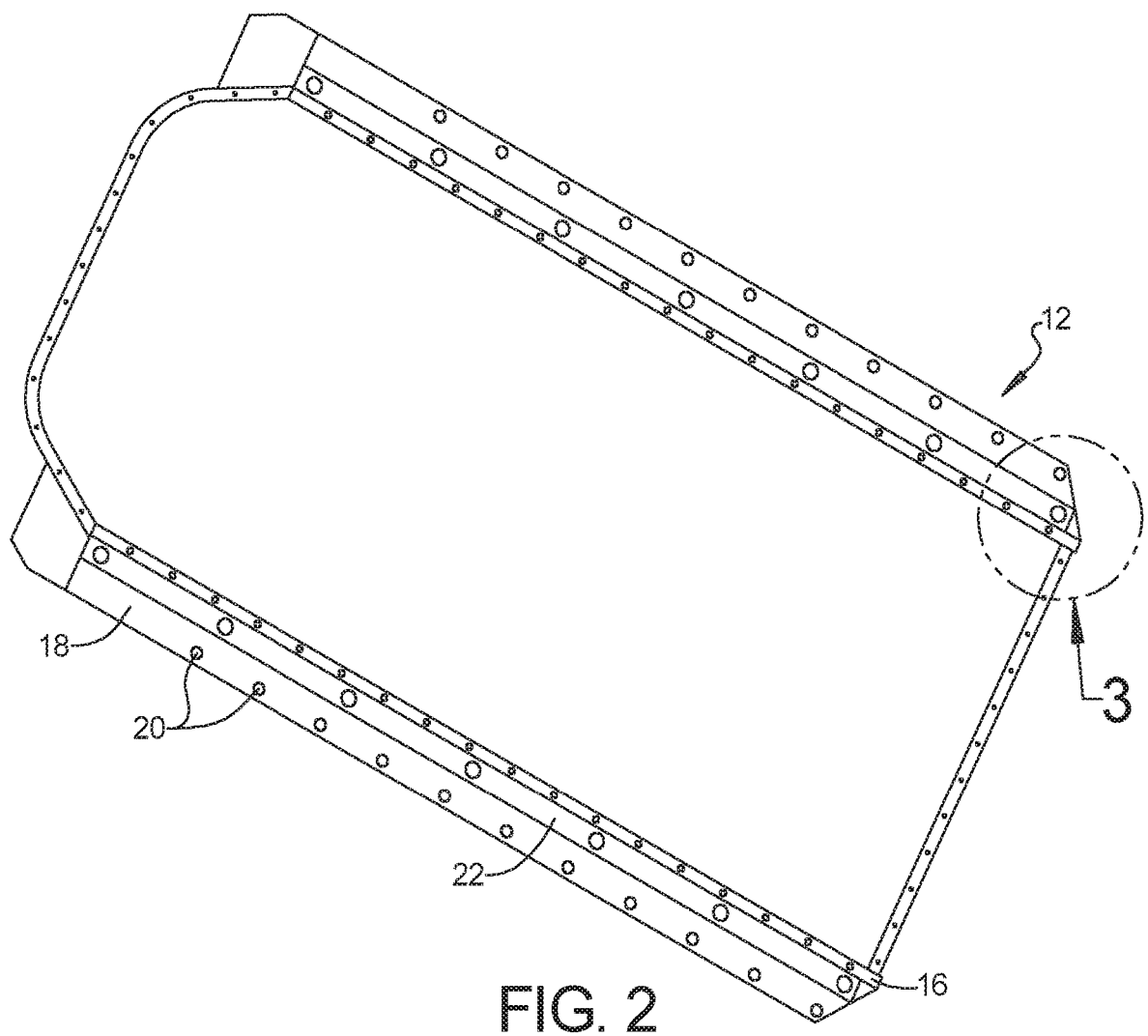
FIG. 2 is a bottom plan view of the battery tray of FIG. 1.

Referring to FIG. 4 and again to FIGS. 1 and 2, the second B-shaped roll-formed member 28 is substantially identical to the first roll-formed B-shaped roll-formed member 24. Each of the B-shaped members are formed of a single plate of metal such as steel which is roll-formed and welded as follows. A first plate portion 60 is roll-formed to create a first end wall 62 which is substantially perpendicular to the first plate portion 60. A next bend is formed in the first end wall 62 to create a second plate portion 64 oriented substantially parallel to the first plate portion 60. A member central wall 66 is formed by creating a bend in the second plate portion 64, followed by formation of a first flange 68. The member central wall 66 stiffens the central portion of the second B-shaped roll-formed member 28 to resist against wall collapse and to absorb impact energy. To simplify construction and reduce component cost, the first flange 68 is fixed using multiple resistance welds, also known as spot welds to an inner face 70 of the first plate portion 60, thereby defining a longitudinal first cavity 72. Spot welds are a faster and less expensive alternative to creating MIG, TIG, or laser welds for intervals or for an entire length of the walls.

The first plate portion 60 is co-planar with a third plate portion 74 which is roll-formed after completion of the spot welding operations to create a second end wall 76 which is substantially perpendicular to the third plate portion 74 and is therefore substantially parallel with the first end wall 62. A next bend is then roll-formed in the second end wall 76 to create a fourth plate portion 78 which is oriented substantially parallel to the third plate portion 74. A second flange 80 is roll-formed defining an end of the fourth plate portion 78. The second flange 80 is then fixed to the member central wall 66 thereby defining a longitudinal second cavity 82. The second flange 80 may be fixed by welding for example using a laser weld 84 and short fillet welds 86 where accessible.

Figure 4:
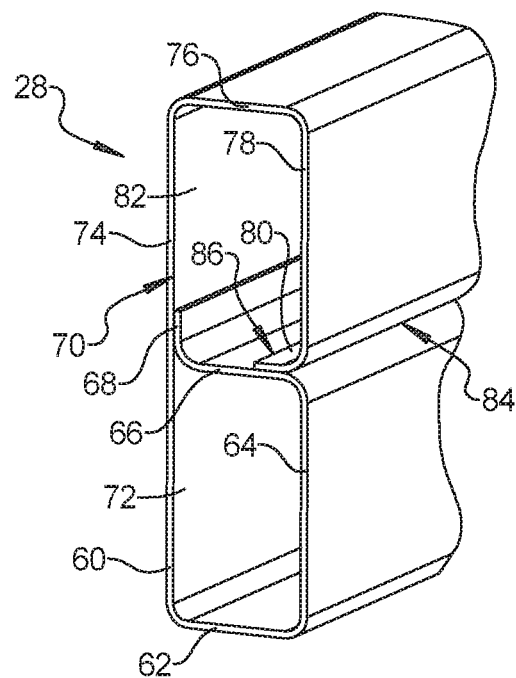
FIG. 4 is an end perspective view of a B-shaped roll-formed member of FIG. 3.

Referring to FIG. 5 and again to FIG. 4, a collapsible roll-formed member 88 is also roll-formed from a single plate of steel material similar to the B-shaped roll-formed members discussed above, but is modified from the B-shaped members such as the second B-shaped roll-formed member 28 to provide a rectangular shaped first portion 90 and a generally square second portion 92. A first flange 94 similar to the first flange 68 is fixed using multiple spot welds prior to formation of a second flange 96, which is then welded similar to the second flange 80. A width 98 of the first portion 90 is less than a width 100 of the second portion 92. A height 102 of the first portion 90 can be equal to, greater than or less than a height 104 of the second portion, allowing the roll-formed member 88 to be tuned or designed to absorb different amounts of loading force at different locations.

Figure 3:
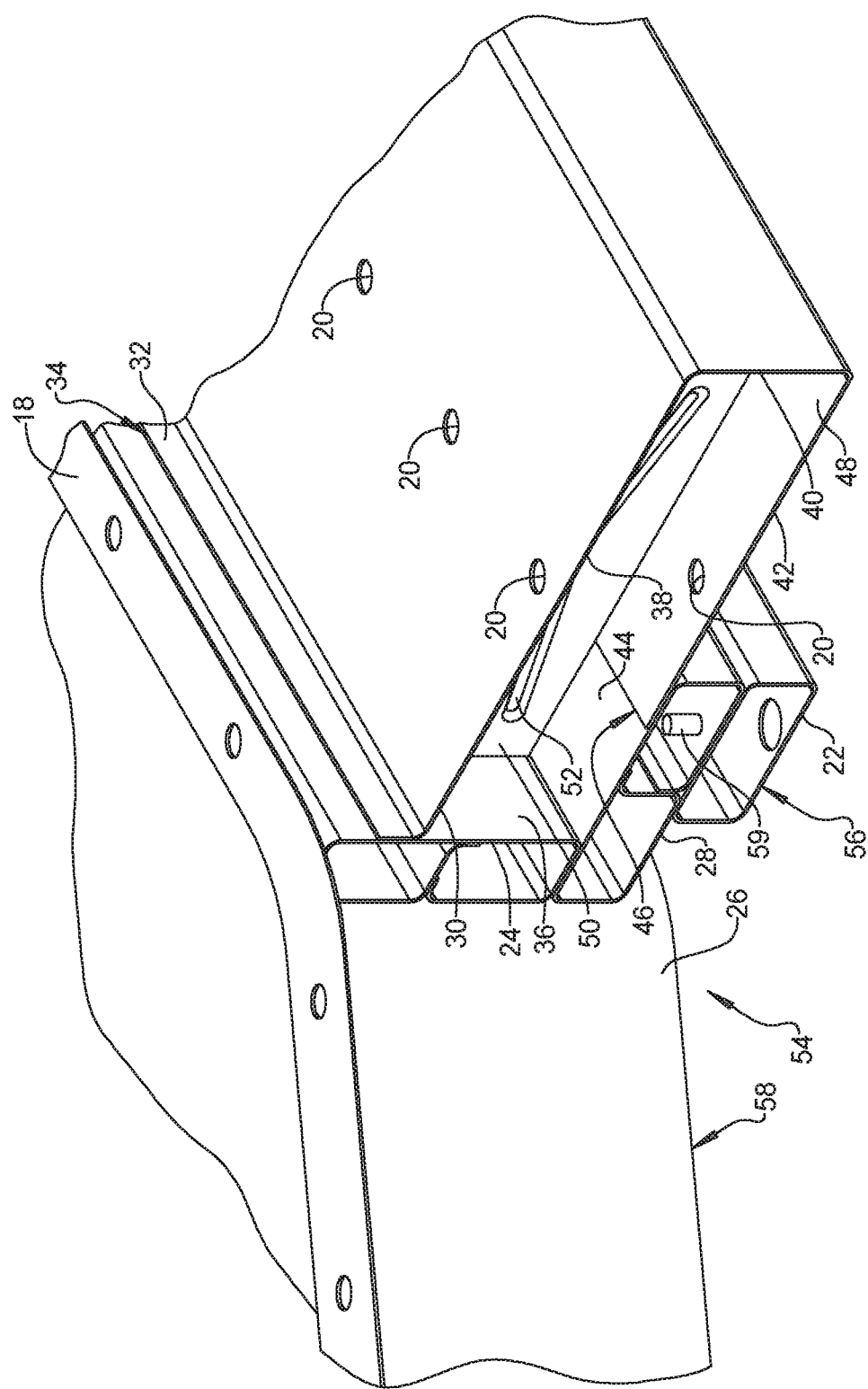
FIG. 3 is a side elevational perspective view of area 3 of FIG. 2.
Figure 5:
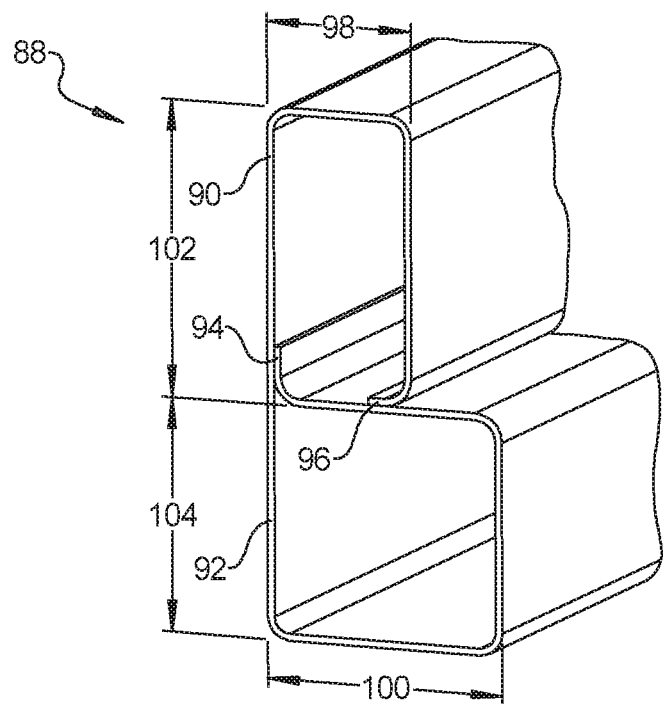
FIG. 5 is an end perspective view of a roll-formed member modified from the B-shaped roll-formed member of FIG. 4.

Referring to FIG. 6 and again to FIG. 5 and FIG. 3 an impact absorbing structure 105 is created similar to the impact absorbing structure 54, having a pair of the collapsible roll-formed members 88, 88' described in reference to FIG. 5, oriented substantially 90 degrees with respect to each other. The narrow first portion 90' of the collapsible roll-formed member 88' having width 98 abuts the side wall 26 of the battery tray 12. The narrow first portion 90 of the collapsible roll-formed member 88 abuts the bottom facing wall of a roll-formed U-shaped attachment member 106 which is substantially identical to the roll-formed U-shaped attachment member 30. A flange 108 of the roll-formed U-shaped attachment member 106 is fixed for example using a weld joint similar to the laser weld 34 to an outside facing wall of the narrow portion 90' of the collapsible roll-formed member 88'. The roll-formed U-shaped attachment member 106 may also include multiple stiffening plates 110 similar in design and function to the stiffening plates 50. The impact rail 22 for the impact absorbing structure 105 is mounted along a substantial length of a ground-facing side of the narrow portion 90 of the collapsible roll-formed member 88. The U-shaped attachment member 106 may also include the apertures 20 to receive fasteners (not shown) to releasably fix the battery tray 12 to the structure of the vehicle 14.

Figure 6:
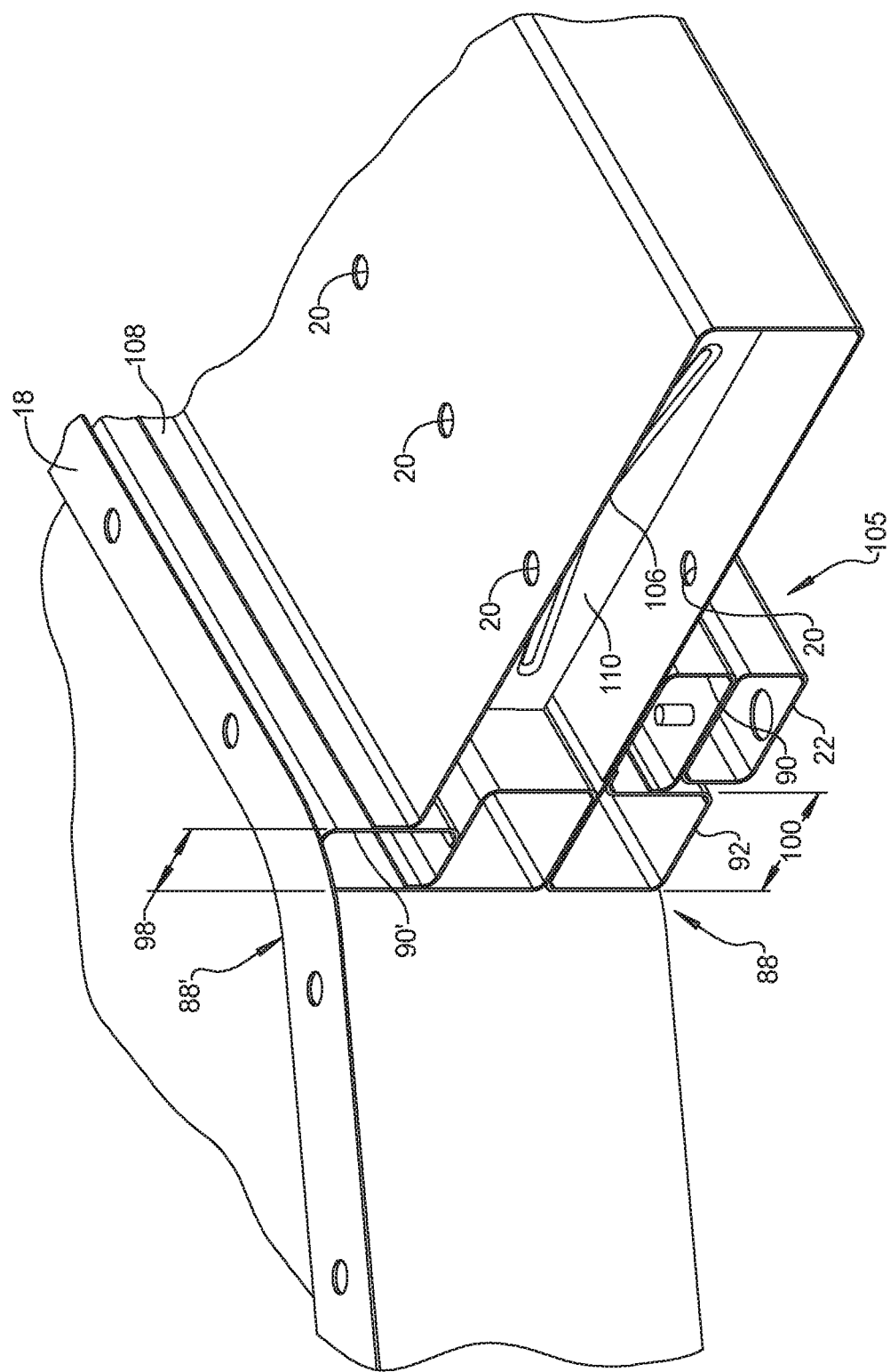
FIG. 6 is a side elevational perspective view modified from FIG. 2 to include the roll-formed member of FIG. 5.

Referring to FIG. 7 and again to FIGS. 3 and 6, a roll-formed U-shaped attachment member or side impact rail 112 is modified from the roll-formed U-shaped attachment member 30 and the roll-formed U-shaped attachment member 106. The roll-formed U-shaped attachment member 112 includes a first wall 114, an outside facing third wall 116 and a second wall 118 oriented substantially parallel to the first wall 114. The first wall 114, the second wall 118, and the third wall 116 define an interior of the U-shaped attachment member 112. The first wall 114 and the second wall 118 have substantially equal lengths. The first wall 114 further includes a first raised rib 120 extending an entire length of the first wall 114, and the second wall 118 further includes a second raised rib 122 extending an entire length of the second wall 118. The ribs 120, 122 extend into the interior of the U-shaped attachment member 112. The first raised rib 120 is oriented downwardly and the second raised rib 122 is oriented upwardly and are in alignment as viewed in FIG. 7, such that an impact load received in a load direction 124 by the third wall 116 acting to collapse the roll-formed U-shaped attachment member 112 will allow collapse until the first raised rib 120 directly contacts the second raised rib 122. The first wall 114, the second wall 118, and the third wall 116 have the same thickness in order to control collapse of the U-shaped attachment member 112. To ensure that an impact load received by the third wall 116 at an angle other than perpendicular to the third wall 116 still permits a controlled wall collapse and direct contact between the raised ribs 120, 122, the second raised rib 122 may include a width 126 which is greater than a width of the first raised rib 120. The first and second raised ribs 120 and 122 are shown in the central area of the U-shaped attachment member 112, and spaced inward from the apertures 20.

However, it is contemplated that the first and second raised ribs 120 and 122 may be disposed closer to either end of the U-shaped attachment member 112, or even outboard of the apertures 20.

A first flange 128 is roll-formed at a free end of the first wall 114, and a second flange 130 is roll-formed at a free end of the second wall 118. The first flange 128 is upwardly directed as viewed in FIG. 7, which is opposite to the second flange 130 which is downwardly directed as viewed in FIG. 7.

Figure 7:
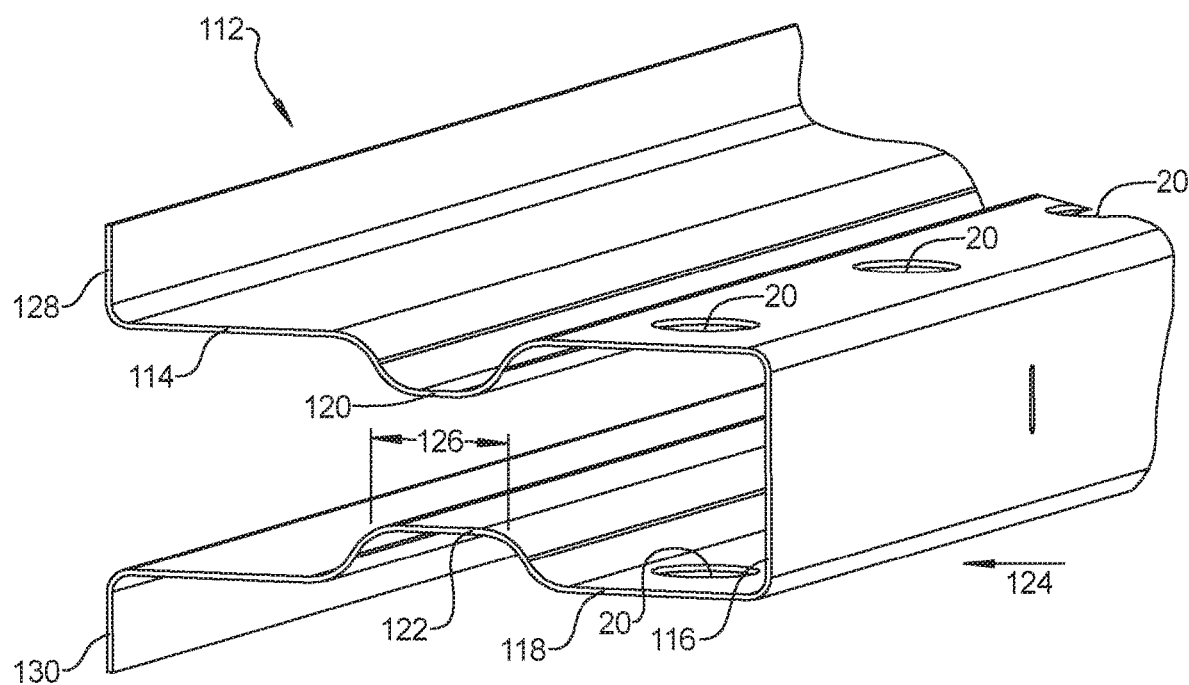
FIG. 7 is an end perspective view of a U-shaped deflectable member having tunable ribs.

Referring to FIG. 8 and again to FIGS. 3, 4 and 7, an impact absorbing structure 133 is modified from the impact absorbing structures 54, 105. The impact absorbing structure 133 includes the roll-formed U-shaped attachment member 112 described in reference to FIG. 7 which provides for fixed attachment of both the first flange 128 and the second flange 130 to an outward facing wall of a collapsible rectangular shaped roll-formed member 132. The roll-formed member 132 may differ from the first and second B-shaped roll-formed members 24, 28 by omitting the member central wall 66, thereby developing less resistance to compression forces received when an impact load is transferred to the roll-formed member 132 from the walls of the roll-formed U-shaped attachment member 112. The impact rail 22 is omitted for clarity.

Referring to FIG. 9 and again to FIGS. 4 and 5, a collapsible roll-formed member 134 is modified from the B-shaped members such as the second B-shaped roll-formed member 28 and the collapsible roll-formed members 88 by the addition of one or more notches in the spot welded flange. According to several aspects, the roll-formed member 134 includes a rectangular shaped first portion 136 and a generally square second portion 138, although two rectangular shaped portions can also be provided similar to the second B-shaped roll-formed member 28. A first flange 140 similar to the first flange 68 is fixed using multiple spot welds prior to formation of a second flange 141, which is then seam or laser welded similar to the second flange 80. The first flange 140 includes at least one and according to several aspects multiple notches, including for example a first notch 142, a second notch 144 and a third notch 146. The notches are formed for example by a stamping or die cutting operation prior to roll-forming operations.

A spacing 148 between successive ones of the notches can be constant or can vary, and a notch width 150 can also remain constant or vary to permit a flexibility of the first flange 140 to be changed or "tuned" as desired to attenuate different impact loads. According to several aspects a length of the notches can remain constant or can also vary as desired to further tune the response of the first flange 140. The second flange 141 is significantly shorter than the first flange 140 and therefore may not provide as much flexibility if notches are provided in the second flange 141, however, one or more notches can also be provided with the second flange 141 if desired.

Figure 10:
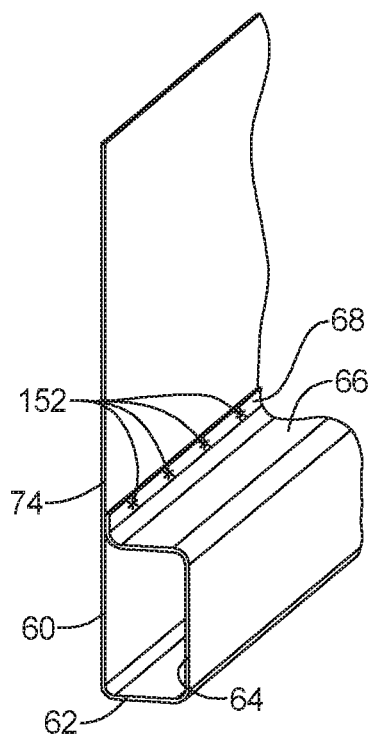
FIG. 10 is an end perspective view of a partial roll-formed B-shaped member of FIG. 4.
Figure 11:
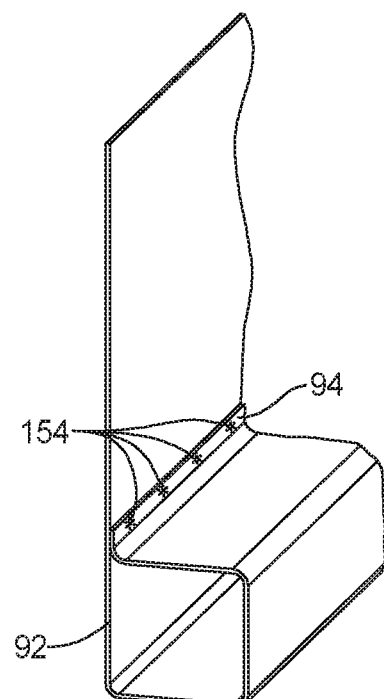
FIG. 11 is an end perspective view of a partial roll-formed member of FIG. 5.
Figure 12:
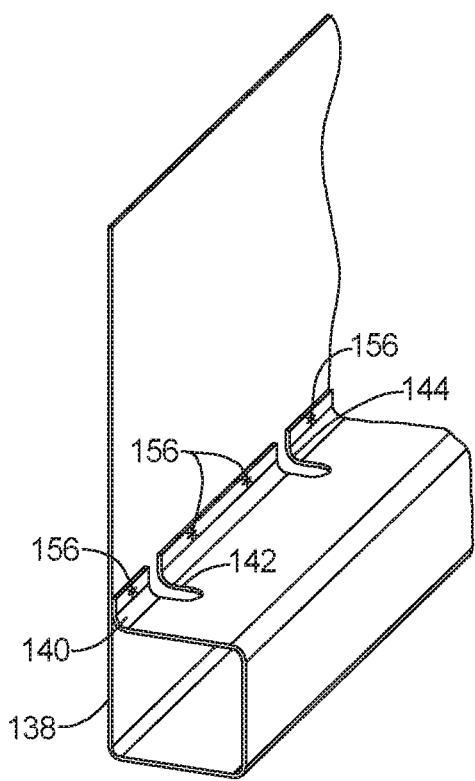
FIG. 12 is an end perspective view of a partial roll-formed member having slots of FIG. 9.

Referring generally to FIGS. 10, 11 and 12, partial roll-formed members are shown after an initial roll-forming step to create a first flange, which is resistance or spot welded to the base plate of the member prior to a next roll-forming step to form a second flange. With specific reference to FIG. 10 and again to FIG. 4, a partial roll-formed second B-shaped roll-formed member 28 includes the first plate portion 60 roll-formed to create the first end wall 62, the next bend formed in the first end wall 62 to create the second plate portion 64, the member central wall 66 formed by creating a bend in the second plate portion 64, and formation of the first flange 68. Multiple resistance or spot welds 152 are then added to fix the first flange 68 to the first plate portion 60, prior to continued roll-forming of the third plate portion 74 shown in FIG. 4.

Referring to FIG. 11 and again to FIG. 5, a partial roll-formed member 88 is shown following completion of the square shaped second portion 92. Multiple resistance or spot welds 154 are then added to fix the first flange 94 to the first plate portion 92, prior to continued roll-forming of the rectangular shaped first portion 90 shown in FIG. 5.

Figure 9:
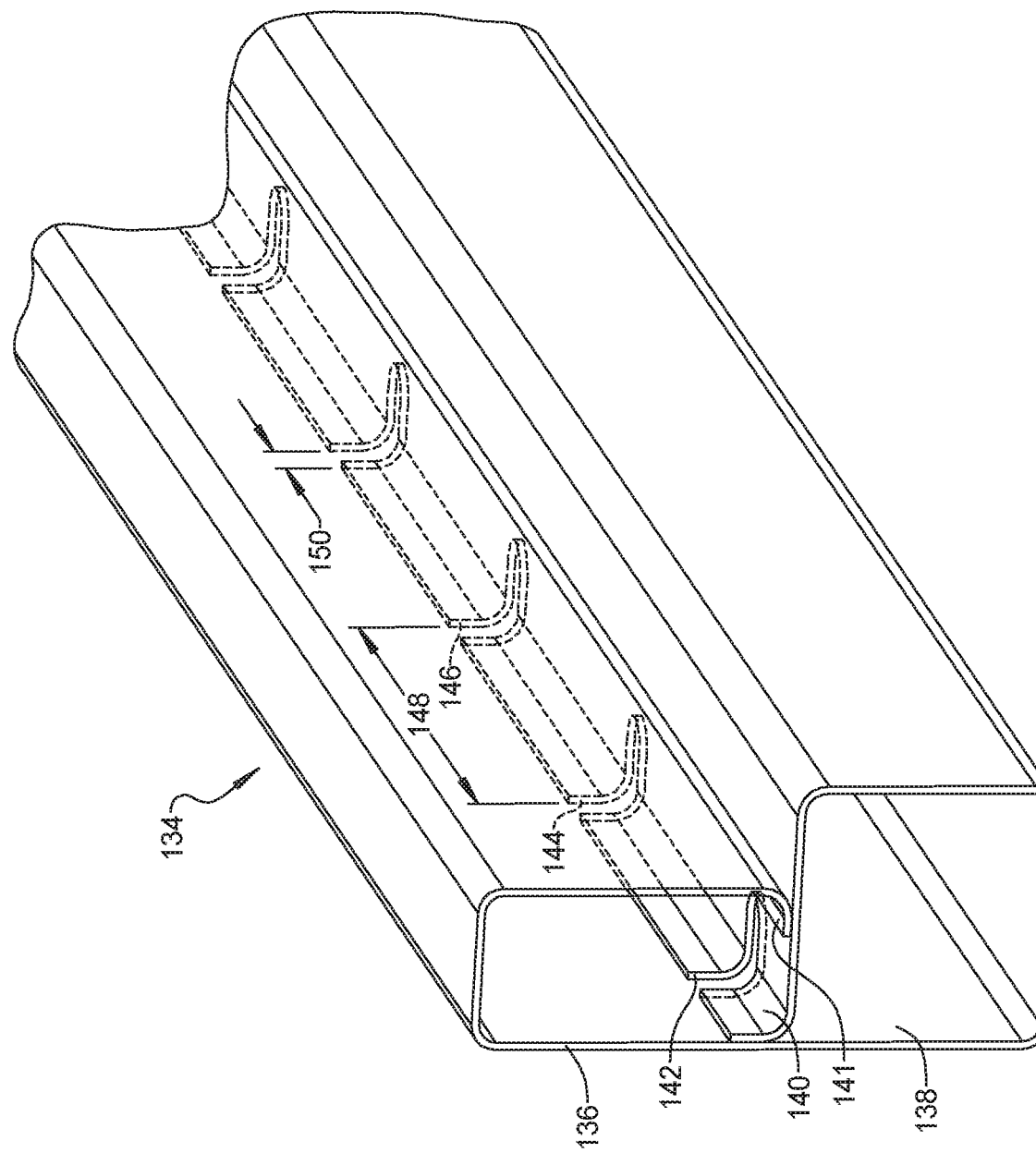
FIG. 9 is an end perspective view of a roll-formed member modified from FIG. 5 to include multiple tunable slots.

Referring to FIG. 12 and again to FIG. 9, a partial roll-formed member 134 is shown following completion of the square shaped second portion 138 showing exemplary ones of the first notch 142 and the second notch 144. Multiple resistance or spot welds 156 are then added to fix the individual portions of the first flange 140 separated by the notches to the plate of the second portion 138, and prior to continued roll-forming of the rectangular shaped first portion 90 shown in FIG. 9.

Figure 13:
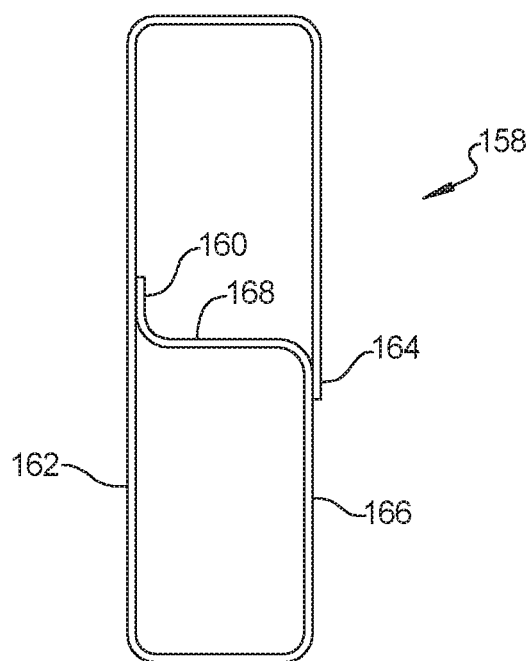
FIG. 13 is an end elevational view of a partial roll-formed member modified from the B-shaped roll-formed member of FIG. 4.

Referring to FIG. 13 and again to FIG. 4, a roll-formed member 158 is modified from the second B-shaped roll-formed member 28 of FIG. 4. Roll-formed member 158 provides a first flange 160 similar in design to the first flange 68 which is spot welded to a first plate portion 162 prior to roll forming a second flange 164. To further enhance access for welding, the second flange 164 is overlapped onto a second plate portion 166, which is similar in position to the second plate portion 64, and welded to the second plate portion 166 instead of being welded to a member central wall 168.

Figure 14:
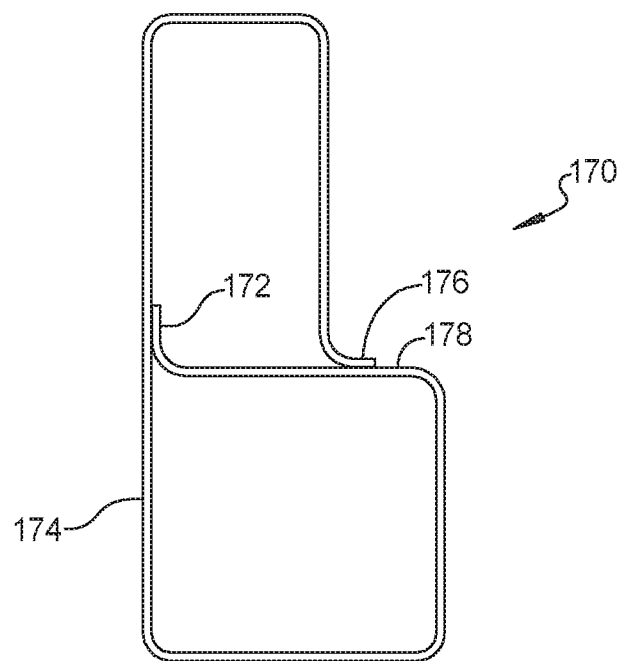
FIG. 14 is an end elevational view of a partial roll-formed member modified from the square-shaped roll-formed member of FIG. 5.

Referring to FIG. 14 and again to FIG. 5, a roll-formed member 170 is modified from the square-shaped roll-formed member 88 of FIG. 5. Roll-formed member 170 provides a first flange 172, similar to the first flange 94, spot welded to a first plate portion 174 prior to roll-forming a second flange 176. To further enhance access for welding, the second flange 176 is directed outwardly (to the right as shown in FIG. 14) and therefore oppositely directed with respect to the second flange 96, and welded onto a member central wall 178.

Figure 8:
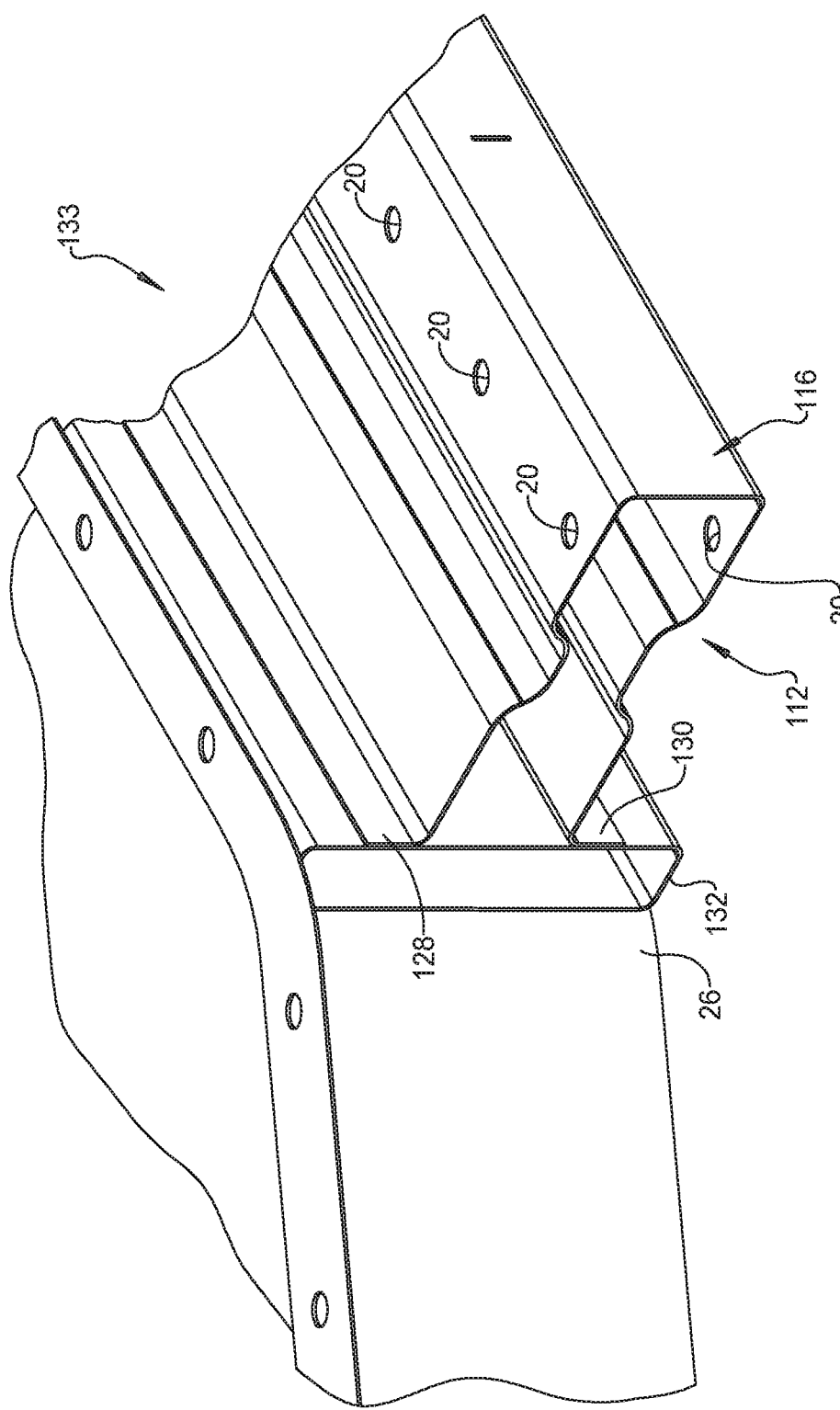
FIG. 8 is a side elevational perspective view modified from FIG. 2 to include the U-shaped deflectable member of FIG. 7.
Figure 15:
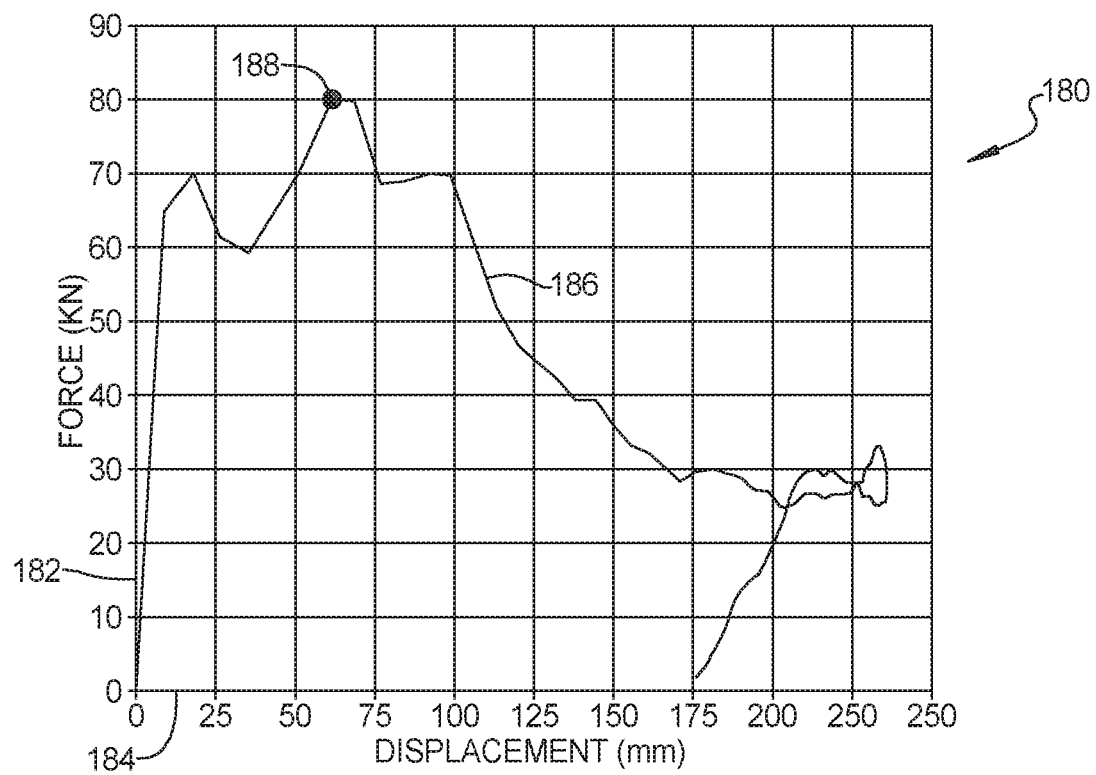
FIG. 15 is a graph depicting force versus displacement for an exemplary structure lacking a central wall.

Referring to FIG. 15 and again to FIG. 8, a graph 180 presents exemplary test data showing force 182 vs. deformation 184 of the structures. FIG. 15 presents impact data for an impact absorbing side structure having D-shaped or rectangle-shaped roll-formed members 132 which lack a member central wall 66. In a curve 186, a maximum force 188 of approximately 79.81 kN is observed for this structure.

Figure 16:
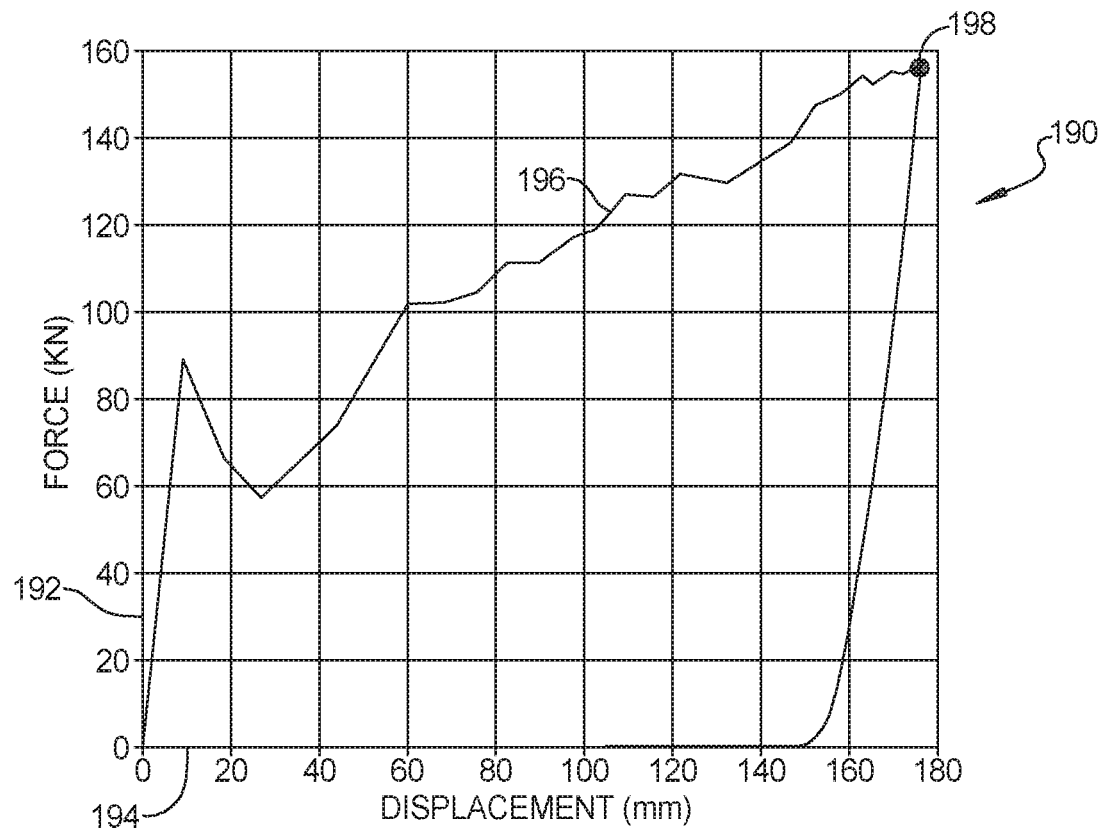
FIG. 16 is a graph depicting force versus displacement for an exemplary structure providing a central wall.

Referring to FIG. 16 and again to FIG. 15, a graph 190 presents exemplary test data showing force 192 vs. deformation 194 of exemplary structures. FIG. 16 presents data for a structure with a B-shaped profile, for example having a member central wall 66 which provides for higher forces. In a curve 196, a maximum force 198 of approximately 156.75 kN is observed for this structure. FIG. 16 data compared to the data of FIG. 15 further shows the B-shaped side members absorb significantly higher forces and deformation before yielding. For the exemplary application of the battery tray 12, it is advantageous to reduce deformation of the side members.

A battery tray having impact absorbing structures and roll-formed members of the present disclosure offers several advantages. These include the incorporation of roll-formed members which are inexpensive to produce, use spot-welding fixed connections where possible, and absorb impact energy in an efficient space envelope. The battery tray can also include shape-memory alloy material in various locations which allow in-place repair of a damaged component without removal or replacement of the component or replacement of the entire battery tray. The selective placement of notches in locations such as in connecting flanges provides for impact load "tuning" to vary impact loads which can accommodated without significant change to the space envelope of the impact absorbing structure.

Additionally, in the claims and specification, certain elements are designated as "first", "second", "third", "fourth", "fifth", "sixth", and "seventh", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function. Moreover, the term "substantially" as used herein includes +/−5 degrees from parallel or perpendicular.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A side rail assembly connected to a battery tray in a motor vehicle, the side rail assembly comprising:
   a side impact rail having:
      a first wall having a first rib extending entirely across a width and a length thereof from the first wall;
      a second wall, the second wall spaced apart from the first wall, the second wall having a second rib extending entirely across a width and a length thereof from the second wall; and
      a third wall, the third wall connected to the first wall and the second wall,
      wherein the first rib extends towards the second rib and the second rib extends towards the first rib, and wherein the first rib extends on either side from the first wall.

2. The side rail assembly of claim 1, wherein the first rib is aligned with the second rib.

3. The side rail assembly of claim 1, wherein the first rib extends along an entire length of the first wall.

4. The side rail assembly of claim 1, wherein the second rib extends along an entire length of the second wall.

5. The side rail assembly of claim 1, wherein the side impact rail is roll-formed from a single plate of metal.

6. The side rail assembly of claim 1, wherein the first wall and the second wall are substantially parallel.

7. The side rail assembly of claim 1, wherein the third wall is substantially perpendicular to the first wall and to the second wall.

8. The side rail assembly of claim 1, further comprising a roll-formed member configured to be connected to the vehicle battery tray.

9. The side rail assembly of claim 8, wherein the first wall includes a first flange connected to the roll-formed member and the second wall includes a second flange connected to the roll-formed member.

10. The side rail assembly of claim 8, wherein the first flange is disposed at a first free end of the first wall and the second flange is disposed at a second free end of the second wall.

11. The side rail assembly of claim 1, wherein the first wall, the second wall, and the third wall have the same thickness.

12. The side rail assembly of claim 1, wherein the second rib has a width greater than a width of the first rib.

13. The side rail assembly of claim 1, wherein the first wall, the second wall, and the third wall define an interior of the side impact rail, and wherein the first rib extends into the interior and the second rib extends into the interior.

14. The side rail assembly of claim 1, wherein the side impact rail is substantially U-shaped.

15. The side rail assembly of claim 1, wherein the first rib is disposed centrally along a width of the first wall and the second rib is disposed centrally along a width of the second wall.

16. A side rail assembly connected to a battery tray in a motor vehicle, the side rail assembly comprising:
   a roll formed side impact rail configured to exhibit the properties of a roll formed tailor welded material, the roll formed side impact rail having:
      a first wall having a first rib with opposite sides each extending away from the first wall;
      a second wall, the second wall spaced apart from the first wall, the second wall having a second rib with opposite sides each extending away from the second wall; and
      a third wall, the third wall connected to the first wall and the second wall,
      wherein the first rib extends towards the second rib and the second rib extends towards the first rib, and wherein the first rib and the second rib are in alignment.

17. The side rail assembly of claim 16, wherein the first wall and the second wall are substantially parallel, and the third wall is substantially perpendicular to the first wall and to the second wall.

18. The side rail assembly of claim 17, wherein the first wall and the first rib have the same thickness and the second wall and the second rib have the same thickness.

19. The side rail assembly of claim 1, wherein the second rib has a width greater than a width of the first rib.

20. A battery tray assembly for a battery powered vehicle, the battery tray assembly comprising:
   a battery tray having a side wall; and
   an impact absorbing structure connected to the side wall, the impact absorbing structure including:
      a first member fixed to the side wall;
      a side impact rail having:
         a first wall having a first rib extending entirely across a width and a length thereof from the first wall to form a discrete raised first ridge relative to the first wall, the first wall connected to the first member;
         a second wall, the second wall spaced apart from the first wall, the second wall having a second rib extending entirely across a width and a length thereof from the second wall to form a discrete raised second ridge relative to the second wall, the second wall connected to the first member; and
         a third wall, the third wall connected to the first wall and the second wall,
         wherein the first rib extends towards the second rib and the second rib extends towards the first rib, and wherein the first rib and the second rib are in alignment.

* * * * *